United States Patent

[11] 3,572,665

| [72] | Inventors | Daniel B. Vincent<br>P.O. Box 5478,<br>Daniel A. Vincent, P.O. Box 5045-Y,<br>Tampa, Fla. 33605 |
|---|---|---|
| [21] | Appl. No. | 866,262 |
| [22] | Filed | Oct. 14, 1969 |
| [45] | Patented | Mar. 30, 1971 |

[54] DESTROYING ODOROUS GASES EVOLVING FROM WET BIOLOGICAL MATERIAL
7 Claims, 4 Drawing Figs.

[52] U.S. Cl. .................................................. 263/40, 110/15
[51] Int. Cl. ....................................................... F26b 17/00
[50] Field of Search........................................... 110/7, 8, 15; 263/40; 34/33

[56] References Cited
UNITED STATES PATENTS

| 2,243,192 | 5/1941 | Clark | 263/19X |
| 2,213,668 | 8/1940 | Dundas et al. | 110/15 |
| 3,304,894 | 2/1967 | Cox et al. | 110/15 |
| 3,410,233 | 11/1968 | Seiler | 110/15 |

*Primary Examiner*—Kenneth W. Sprague
*Attorney*—Cushman, Darby and Cushman

ABSTRACT: Ways and means are provided for destroying odorous components of gases released from garbage and food waste byproduct processing plants during receiving, storage and processing operations. Destruction is accomplished by collecting all such odorous gases and cycling them through a high temperature region, raising them to an odor-destroying temperature, of e.g. 1300° F., before releasing them to the atmosphere. Where wet composted material is to be dried in the plant, some of the gases are utilized in a direct contact dryer. The gases utilized in the dryer are preheated by indirect heat exchange with the deodorized gases, thus lowering the temperature of the exhausted, deodorized gases, to e.g. 600° F.

INVENTORS
DANIEL B. VINCENT
DANIEL ASHLEY VINCENT
BY Cushman, Darby & Cushman
ATTORNEYS INVENTORS
DANIEL B. VINCENT
DANIEL ASHLEY VINCENT
BY Cushman, Darby & Cushman
ATTORNEYS

DESTROYING ODOROUS GASES EVOLVING FROM WET BIOLOGICAL MATERIAL

BACKGROUND OF THE INVENTION

In processing and drying many products, such as garbage waste, poultry processing waste, waste from preparing and freezing shrimp and fish fillets, processing, drying and preserving both the liquid and solid phases of trash fish and menhaden-type oily fish, there occurs odorous gases that drift for miles around causing objectionable conditions that have been endured heretofore, but must now be eliminated to satisfy human insistence on a more pleasing environment and consequent new laws being written requiring reduction of air and water pollution.

Many systems have been invented to try to overcome these pollution conditions, but most are only partially satisfactory, or result in the generation of other waste products to be disposed of, such as wash waters from a wet recovery system of filter screens from a dry recovery system.

Catalytic systems have been used to incinerate dry, combustible, particulate matter in organic material processing-plant exhaust gases at temperatures well below the flame point of the combustible material, but in general the catalysts are subject to rapid poisoning or becoming inactive because of a coating that forms around the catalytic carrier by foreign matter in the airstream. High cost to replace the catalyst can be prohibitive.

In times past, a plant located several miles from a populous area could operate even in face of complaints from a few nearby residents by masking the stack gases, which carried the most objectionable odors miles away, but did nothing about plant odor polluting the nearby air. Now laws are being passed that make it necessary for the plant to hear and satisfy even those few people, and therefore arrange to eliminate all odors emanating from the plant.

To overcome the above problems, there is provided in accordance with the principles of the invention a system which encompasses an entire processing plant, including all air within the plant and exhausting from it.

SUMMARY OF THE INVENTION

Ways and means are provided for destroying odorous components of gases released from garbage and food waste byproduct processing plants during receiving, storage and processing operations. Destruction is accomplished by collecting all such odorous gases and cycling them through a high temperature region, raising them to an odor-destroying temperature of e.g., 1300° F. before releasing them to the atmosphere. Where wet composted material is to be dried in the plant, some of the gases are utilized in a direct contact dryer. The gases utilized in the dryer are preheated by indirect heat exchange with the deodorized gases, thus lowering the temperature of the exhausted deodorized gases, to e.g., 600° F.

The principles of the invention will be further hereinafter discussed with reference to the drawings wherein a preferred embodiment is shown. The specifics illustrated in the drawings are intended to exemplify, rather than limit, aspects of the invention as defined in the claims.

DESCRIPTION OF THE PREFERRED EMBODIMENTS

Figure 1:
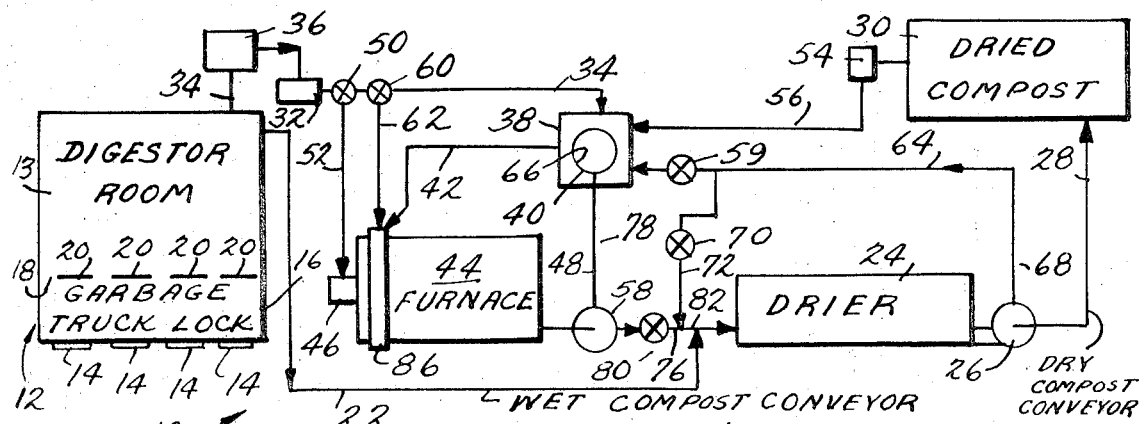
FIG. 1 is a schematic view of an organic material processing plant including an odor destruction system provided in accordance with the invention.

One modification of the system is described below, which involves a garbage disposal plant 10 which includes a garbage receiving and processing building 12. Here the garbage is received in enclosed trucks through folding doors 14. Space 16 is sized to accommodate four large trucks. They are backed up against partition 18. Doors 14 are closed and doors 20 in the partition wall 18 are opened. The trucks are then unloaded into the digester room 13. Doors 20 are then closed, doors 14 are opened; the trucks drive out, four more trucks are driven in and the unloading process is repeated.

In room 13 tramp metal and other similar objectionable matter are removed, the garbage is ground, treated, and digested by a conventional techniques to produce a damp fertilizer compost that must be dried to a desirable moisture content for packaging and commercial distribution.

From the digesters, the damp compost is conveyed in a fully enclosed tunnel 22 to dryer 24 then through cyclone separator 26 where the dried compost is separated from the drying airstream and passes through enclosed conveyor 28 to the bulk storage and packaging building 30.

All building conveyors, ducts, and the like within the system 10 are maintained under a slight negative air pressure. Therefore, air always flows into the processing plant buildings when any door is open.

Exhaust fan 32 is constantly operating, drawing a flow of air through duct 34 from building 12. The quantity of this air is controlled by the automatic positioning of a valve 36 within the duct 34. This valve is actuated by a pressure control system within the building and downstream from fan 32. This not only removes from the building the required CFM of odorous air to maintain a constant negative pressure within the building, but will also open an orifice to admit outside air to the system if demanded by the dryer controls.

This odorous air (plus admitted outside air, when demanded) is passed into a stainless steel heat exchanger 38 in which it is passed over a nest of 4-inch tubes and heated on its way to the furnace by a flow of hot gases from the furnace within the tubes passing to atmosphere through exhaust stack 40. The digester air is passed from the heat exchanger 38 through duct 42 to furnace 44 in which the temperature of the gases is raised to 1300° F. by action of fuel oil or gas burning in burner 46. At this temperature all odors in the air are oxidized. The odor free air is returned into heat exchanger 38, through duct 48 and through the inside of the stainless steel heat exchanger tubes and out through exhaust stack 40. In passing through the tubes the 1300° F. temperature is reduced to a predetermined exhaust temperature (in this case 600° F.) by giving up part of its heat to the incoming airstream passing around the tubes.

Air for combustion of fuel in the burner is supplied from the incoming digester airstream through control valve 50 and duct 52.

Air from dry material room 30 passes through exhaust fan 54, duct 56, into the heat exchanger and furnace and out of the stack as described above for digester room air.

The operation described above covers the plant operation at night or other times when the dryer is not being used. In such case, valve 58 between the furnace and the dryer is closed, as shown.

When the dryer is operating, valve 58 is opened. Valve 60 in the duct 34 between fan 32 and heat exchanger 38 is operated to divert the digester air directly into the furnace 44 through duct 62 into, through and out of dryer 24, cyclone separator 26 back to heat exchanger 38, through duct 64, into furnace via duct 42 and out through duct 48 and stack 40. All gases in the furnace are controlled to a selected minimum temperature, in the instance of the example of 1300° F. by a thermocouple 78 located where the furnace gases enter the exhaust chamber 66 of the heat exchanger 38 and actuates a control raise or lower the burner firing rate to maintain this 1300° temperature.

Flow of wet compost to the system must obviously depend on the kind and quantity of garbage being received into the plant. Also, the final dried compost must contain a desired proportion of moisture, for instance, 12 percent.

It is therefore necessary to control not only the heat energy flowing in the airstream to the dryer, but also the required quantity of air to move the compost through the dryer in sufficient amount and temperature to evaporate all moisture from the stream of damp compost flowing to the dryer except the desired percentage to be left in the final product.

This is accomplished by a heat-sensitive probe 68 inserted in the airstream flowing from the dryer that controls a system of valves actuated by this probe (either electrically or by pneumatic means) to cause the proper temperature and flow of hot air from the furnace into the inlet of the dryer to evaporate this excess moisture from the damp compost as the hot air and compost move concurrently through the dryer and to result in an exhaust air temperature at the setting of the probe and at the desired moisture content in the material.

Should the required temperature and quantity of the hot air entering the dryer be exactly 1300° F. and at a flow rate equal to the required CFM from the digester house, valve 58 is opened automatically to permit this 1300° F. hot air to enter the dryer. If, however, the temperature required is lower than 1300° F., probe 68 will sense a rise in the temperature of the exhaust gas from the dryer and automatically partially close valve 58 and open valve 70 to introduce a flow of 180° F. recycle gases from return gas duct 64 to enter the furnace duct and mix with the reduced flow of 1300° F. gas to cause the proper flow and temperature needed within the dryer.

Should the required temperature within the dryer be higher than a furnace temperature of 1300° F., the temperature of the gases at control valve 58 will begin to drop. This will automatically close valve 70 and reset valve 58 to a higher set reading. This will in turn open the burner 46 to increase its firing rate and thereby raise the furnace air temperature to meet this demand.

Temperature of the exhaust gases exhausted to atmosphere will depend upon the surface area of the tubes built into the heat exchanger. In most cases an exhaust of 220° F. is ample for proper function of the dryer. However, at this temperature, condensation of moisture in the exhaust gases will occur on cool days, a definite steamlike plume will discharge from the stack, and droplets like rain will fall around the plant. At an exhaust temperature of 600° F., the exhaust gases from the stack are invisible from the ground—no plume develops in 40° F. weather and no condensate falls from the exhaust gases.

Figure 2:
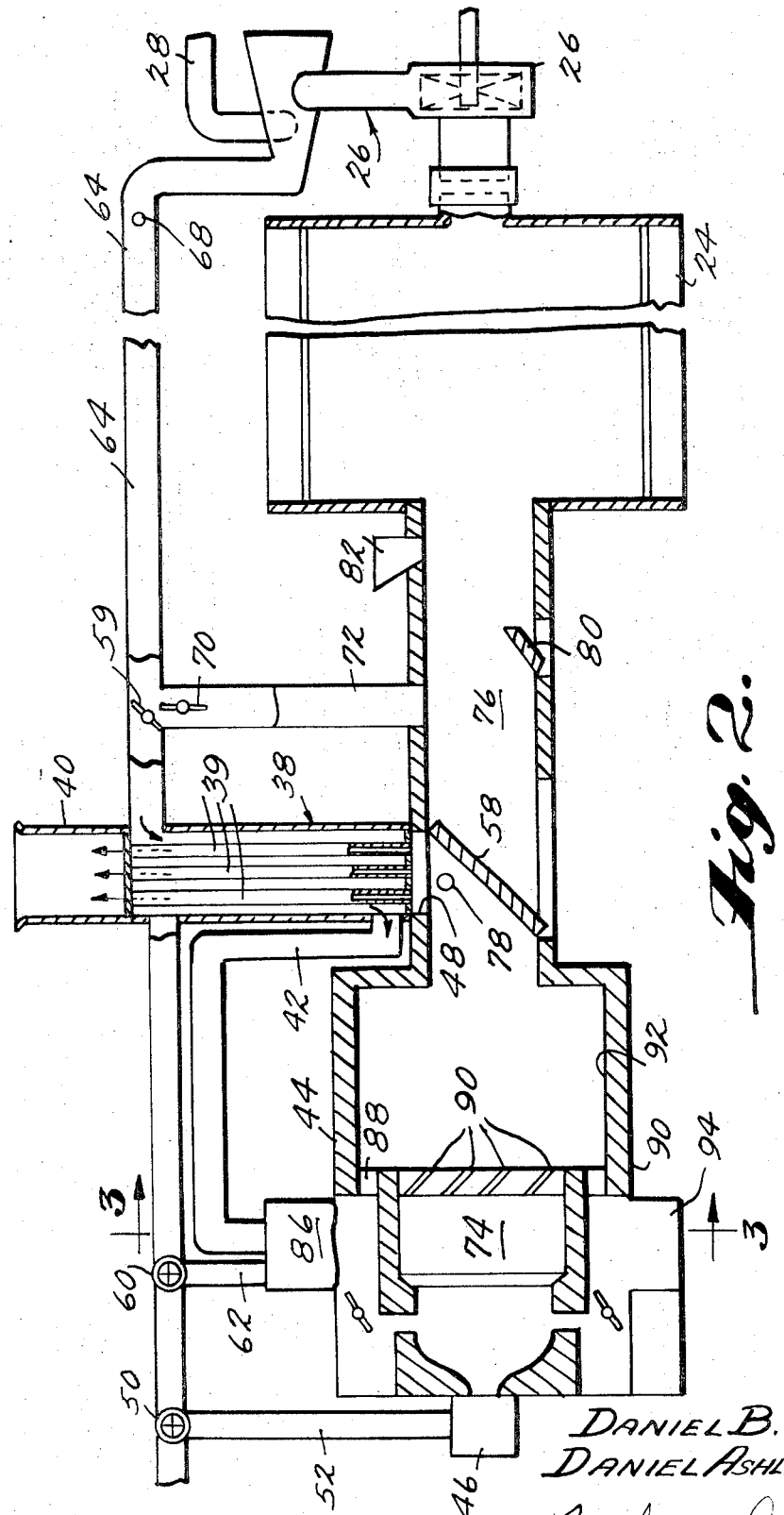
FIG. 2 is a longitudinal sectional view, with some portions schematically illustrated, of a portion of the plant of FIG. 1.

FIG. 2 shows the furnace, dryer, heat exchanger and cyclone separator portions of the FIG. 1 equipment in somewhat more detail including interconnections and controls. At present, direct fire dryers of many processing plants emit solid particles an odorous gases to the atmosphere in quantities considered objectionable to the neighboring populace. This is overcome according to the present invention by providing a furnace in which sufficient heat is generated to either oxidize or change the nature of the odorous gases and combustible particulate matter to nonobjectionable gases.

In the operation of the direct heat dryers more inbound air than is necessary for combustion of the fuel oil being used is required in order to move the material being dried through the dryer. In accordance with the present invention, some of the excess air is recycled with its moisture-laden water vapors, back through the furnace to reduce the quantity of the airodorous gases and particulate matter that would otherwise be exhausted to atmosphere, at the same time oxidizing or changing the nature of the recycle products in the combination chamber to actually destroy the objectionable conditions and, therefore, exhausting to atmosphere nonobjectionable gases.

A temperature of 1200° to 1300° F. in the presence of a small amount of oxygen has been experimentally found to completely destroy exhaust odors from most of the organic products which food byproduct processing plants are dehydrating, particularly fish meal, garbage waste, dried citrus pulp, etc.

Referring to FIG. 2, a startup of the dryer 24 will now be described. Valve 58 is closed during nonoperation of the dryer, as shown. Fuel oil or gas is premixed with odorous air for combustion at 46. Combustion is completed in area 74 of the furnace 44. The flue gases from the combustion taking place pass out of exhaust stack 40, which is fitted with a series of stainless steel tubes 39. Dryer 24 and exhaust fan 26 are started. All valves are in position as shown in FIG. 2. Air is circulated through ducts 64 and 72 into refractory lined duct 76. As soon as the thermometer of 78 reaches the desired oxidizing temperature of the odorous gases and particulate matter, for instance 1300° F., a conventional automatic device (not shown) moves valve 58 to its horizontal position in duct 76 allowing the hot gases to flow into dryer 24. Excess cold air duct 80 is closed. Inbound wet material to be dried is introduced to the system at 82 via the tunnel 22 and dried material is removed at 26 for transfer through tunnel 28.

There is another temperature control device 68 in the exhaust stack 64. This is set to control the exhaust gas temperature at the desired degree necessary at this position for dryness of the final product, for instance, 180° F. The device 68 controls the setting of valves 59 and 70. Should the temperature be lower than 180° F., valve 59 will open, valve 70 will close permitting 1300° air to enter the dryer through duct 76. (Valve 58 can also be operated by device 68 in this sequence as described above in respect to FIG. 1). The dryer exhaust gases pass around the outside of tubes 39 in spaces exteriorly of the tubes and out through duct 42 entering a chamber 86 that at least partly circumferentially surrounds the jacket of the furnace from which it passes into the furnace oxidizing chamber 74 through an annular opening 88. This opening is provided with a series of angularly spaced stainless steel baffle plates 90 arranged with like angular pitch in a manner that will cause air passing through the apertures defined by the portions of the opening 88 between adjacent plates 90 to spin around and therefore throw particulate matter against the hot refractory walls 92 of the furnace and maintain the material in this part of the furnace for sufficient time, for instance 1 second, for complete oxidation to take place. These mixed gases then pass out of the furnace, part through duct 76 to the dryer and part through the tube system 39 depending upon the degree of openness of the valve 58.

Heat transfer takes place within the exhaust stack 38 to reduce the exhaust temperature from for instance 1300° to about 600° F., in the meantime increasing the temperature of the gases flowing around the tubes 39 and through duct 42 to the furnace sufficiently to absorb the heat transferred to the tubes. Should the temperature of the exhaust gases passing through the dryer rise above 180° F. (this is the preferred temperature when operating upon garbage), control device 68 will partially close valve 59 and partially open valve 70 allowing the corresponding cooler gases to mix with the hot gases from furnace 44 to maintain control device 68 at 180° F.

Excess cold air can be admitted to the system through valve 80 if desired. In all cases, however, all of the exhaust gases from the dryer must pass through the furnace before they can reach the outside of the plant 10. In the furnace, the odorous components of the gases are oxidized at high temperature.

Figure 3:
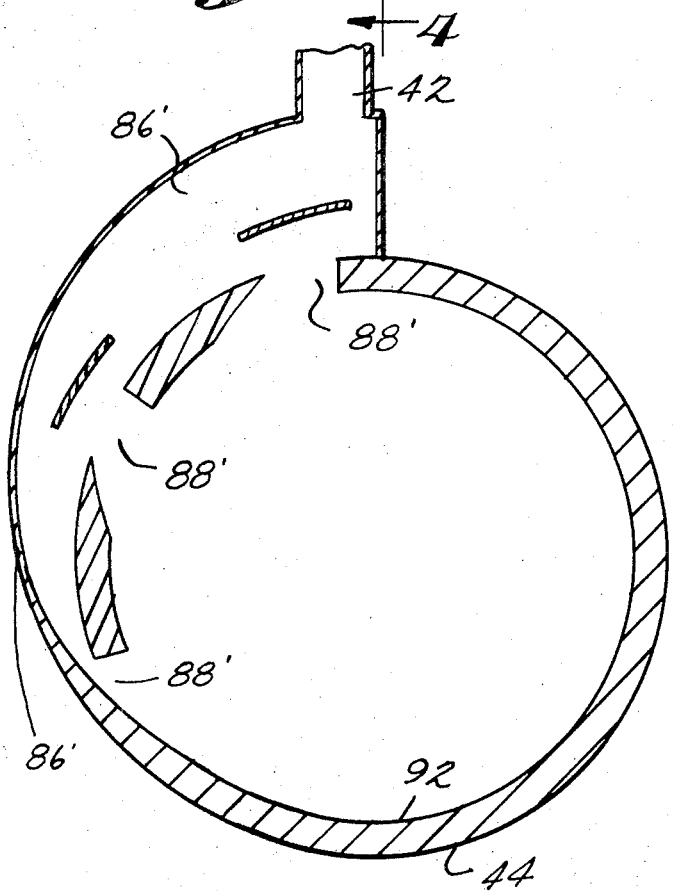
FIG. 3 is a cross-sectional view of a modification, comparing in position to a view taken substantially along line 3–3 of FIG. 2.
Figure 4:
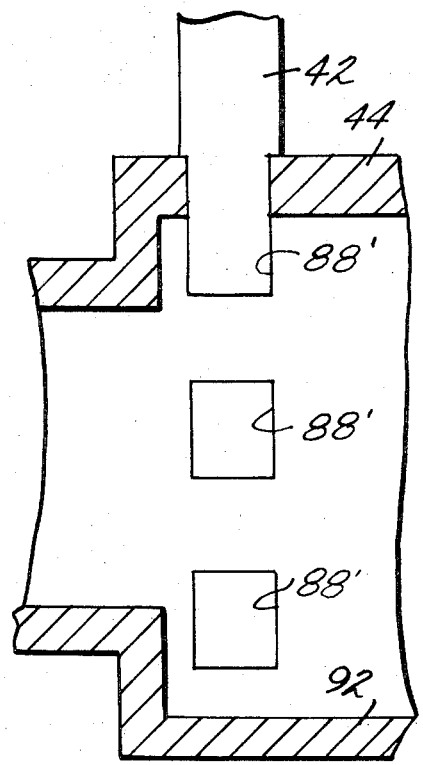
FIG. 4 is a fragmentary longitudinal sectional view taken along line 4–4 of FIG. 3.

In FIG. 2 the recycled gases sent via conduit 64 to the jacket of the furnace are shown as entering through a duct 86 surrounding the furnace. In some cases, excess particulate matter may fall out from the airstream and lodge in the bottom of this duct at 94 when the velocity is not sufficient to keep the particles in suspension in the air. Where such conditions exist, duct 86 may be constructed as shown at 86' in FIGS. 3 and 4 so that it proceeds from the top, about one-third the way around the furnace jacket, at a decreasing thickness. Air entering the furnace is delivered through ports 88' spirally communicating with the duct 86' in a manner that definitely delivers all of the particles into the furnace in centrifugal manner. The final port 88' is located where the duct 86' merges with the furnace jacket, which occurs angularly short of the bottom of the furnace jacket.

The term "gases evolving from biological material" is used herein to denote gases evolved from garbage, fish, offal, citrus cannery waste and similar products during the storage, biochemical digestion, processing or drying thereof.

A suitable dryer for use as the dryer 24 is the Model CLFRD direct heat dryer manufactured by Dan B. Vincent, Inc., Tampa, Fla.

Temperature responsive controllers for operating valves are commercially available. An example of one which can be used to operate valves as described herein is available from Westinghouse Electric Corporation, Pittsburg, Pa., Hagan Computer Systems Division. Valves operable by such means are also commercially available. An example of one which can be used in the apparatus as described herein is available from Westinghouse Electric Corporation, Hagan Computer Systems Division.

All temperatures recited herein are in degrees F.

It should now be apparent that the apparatus for destroying odorous gases evolving from wet biological material as described hereinabove possesses each of the attributes set forth in the specification under the heading "Summary of the invention" hereinbefore. Because the apparatus for destroying odorous gases evolving from wet biological material of the invention can be modified to some extent without departing from the principles of the invention as they have been outlined and explained in this specification, the present invention should be understood as encompassing all such modifications as are within the spirit and scope of the following claims.

We claim:

1. Apparatus for drying wet biological material and for destroying odorous gases evolving therefrom before, during and after drying comprising:
   a combustion chamber;
   means for feeding fuel and air containing odorous gases to said combustion chamber for combustion therein to produce an odorless stream containing hot gaseous combustion products having a temperature of at least about 1200° F.;
   an indirect heat exchanger including a first side and a second side; means defining a heat exchange surface separating said first and second heat exchanger sides, said heat exchanger second side communicating with the atmosphere via a stack;
   first conduit means communicating between said combustion chamber and said heat exchanger second side, whereby said hot gaseous combustion products stream may be vented to the atmosphere via said stack after passage through said heat exchanger on the second side of said heat exchanger;
   a dryer for drying wet biological material by direct contact with a moving gas stream; conduit means for adding wet biological material to said dryer; conduit means for withdrawing dried biological material and the moving gas stream from said dryer;
   second conduit means communicating between said combustion chamber and said dryer for providing at least a portion of said moving gas stream for drying said wet biological material;
   valve means interposed in said first and second conduit means for regulating the relative amounts of said hot gaseous combustion products stream passing through said first and said second conduit means;
   centrifugal means for separating the withdrawn dried biological material and the remainder of the moving gas stream;
   third conduit means communicating between the first side of said indirect heat exchanger and said centrifugal separating means, for forwarding the separated moving gas stream to the indirect heat exchanger for heating by indirect heat exchange with the hot gaseous combustion products stream passing to said stack via the second side of said indirect heat exchanger;
   Fourth conduit means communicating between said second conduit means and said third conduit means for recycling at least a portion of said separated moving gas stream to said dryer;
   fifth conduit means connecting said first side of said indirect heat exchanger and said combustion chamber;
   temperature responsive valve operator means having a temperature sensing portion thereof disposed to sense the temperature of said separated moving gas stream upstream of said fourth conduit means;
   valve means operable for regulating the relative amounts of said moving gas stream (a) passing through said fourth conduit means to said second conduit means for recycling to said dryer and (b) passing via said indirect heat exchanger first side to said fifth conduit means for recycling to said combustion chamber; and
   said temperature responsive valve operator means being connected to the last-mentioned valve means for maintaining said separated moving gas stream upstream of said fourth conduit means at about 180° F.

2. The apparatus of claim 1 wherein said valve operator means is further connected to the first-mentioned valve means for coordinate operation thereof with the last-mentioned valve means.

3. The apparatus of claim 1 wherein said withdrawing means and said separating means comprise a cyclone separator.

4. The apparatus of claim 1 wherein said fifth conduit means terminates exteriorly of said combustion chamber in means defining a duct proceeding at least partially circumferentially of said combustion chamber, means defining a plurality of angularly spaced, spirally proceeding openings into said combustion chamber from said duct.

5. The apparatus of claim 1 further including: storage enclosure means for receiving the dried biological material; enclosed conveyor means for transferring the dried biological material from said centrifugal separating means to said storage enclosure; an exhaust pump having a pressure side and a suction side; conduit means communicating the suction side of said exhaust pump with said storage enclosure means for maintaining at least slightly lower than atmospheric pressure therein; conduit means communicating the pressure side of said exhaust pump with the first side of said indirect heat exchanger.

6. The apparatus of claim 1 further including: means defining a wet biological material processing room; enclosed conveyor means for transferring the wet biological material from said processing room to said conduit means for adding wet biological material to said dryer; an exhaust pump having a pressure side and a suction side; conduit means communicating the suction side of said exhaust pump with said processing room for maintaining at least slightly lower than atmospheric pressure therein; conduit means communicating the pressure side of said exhaust pump with the first side of said indirect heat exchanger.

7. The apparatus of claim 6 further including means defining an enclosed truck lock adjoining said processing room and sharing a common wall therewith; means defining at least one truck receiving opening into said truck lock; means defining at least one opening through said common wall; door means for both said openings, whereby at least one truck containing wet biological material for processing may enter said truck lock and be enclosed therein by closing the door of said truck receiving opening and said door of said opening in said common wall may then be opened for transfer of said wet biological material from the truck into the processing room.